US005477251A

United States Patent [19]

Sugimura

[11] Patent Number: 5,477,251

[45] Date of Patent: Dec. 19, 1995

[54] METHOD OF FORMING DEVELOPER THROUGH-HOLES IN A PRINT HEAD

[75] Inventor: Hideki Sugimura, Osaka, Japan

[73] Assignee: Mita Industrial Co, Ltd., Osaka, Japan

[21] Appl. No.: 304,478

[22] Filed: Sep. 12, 1994

[30] Foreign Application Priority Data

Sep. 28, 1993 [JP] Japan .................................... 5-265832

[51] Int. Cl.[6] .............................. B41J 2/06; G01D 15/06

[52] U.S. Cl. ............................ 347/55; 347/123; 347/148

[58] Field of Search .................................... 346/159, 155; 347/55, 123, 148

[56] References Cited

U.S. PATENT DOCUMENTS 5,068,961 12/1991 Nishikawa .......................... 346/159 X 5,257,045 10/1993 Bergen et al. .......................... 346/159

FOREIGN PATENT DOCUMENTS 63-137858 6/1988 Japan .................................... 346/155

*Primary Examiner*—Peter S. Wong

*Assistant Examiner*—Randy W. Gibson

*Attorney, Agent, or Firm*—Beveridge, DeGrandi, Weilacher & Young

[57] ABSTRACT

This invention is directed to a method of forming developer through-holes in a print head which has a plurality of first electrodes and a plurality of second electrodes arranged in matrix with an insulating layer sandwiched therebetween. A main portion of each of the first electrodes is comprised of a couple of electrodes disposed in parallel with each other at a specified gap between them, and a main portion of each of the second electrodes is comprised of a couple of electrodes disposed in parallel with each other at a specified gap between them. An intersecting portion of each of the first electrodes and each of the second electrodes is irradiated with laser light to form a hole in the insulating layer. Thus, the gap between the parallel electrodes of each of the first electrodes, the hole formed in the insulating layer, and the gap between the parallel electrodes of each of the second electrodes together define a developer through-hole.

8 Claims, 14 Drawing Sheets

METHOD OF FORMING DEVELOPER THROUGH-HOLES IN A PRINT HEAD

FIELD OF THE INVENTION

The present invention relates to a method of forming holes conducting developer in a print head in a powder jet image forming apparatus.

PRIOR ART

The applicant has developed a powder jet image forming apparatus as shown in FIG. 13. The powder jet image forming apparatus includes a print head 2 for controlling passage of toner electrostatically charged in a specified polarity such as a negative polarity, a toner supply roller 1 for supplying toner to the print head 2, a recording paper carrying roller 3 for guiding recording paper P toward the print head 2, and a fusing roller 4 for fusing on the recording sheet P the toner transferred thereto.

The print head 2 has an insulating substrate 20, first electrodes 21 formed in one side of the insulating substrate 20 proximate to the toner supply roller 1, and second electrodes 22 formed on the other side of the insulating substrate 20 proximate to the recording paper carrying roller 3, as shown in FIG. 13, FIG. 14 and FIG. 15. The first electrodes 21 and the second electrodes 22 are arranged in matrix. FIGS. 14 and 15 depict the print head 2 seen from a side proximate to the recording paper carrying roller 3. At each of the intersections of the first electrodes 21 and the second electrodes 22, a toner through-hole 23 extending through the print head 2 is formed.

ON voltage (e.g., −100 V) and OFF voltage (e.g., +300 V) are selectively applied to the first electrodes 21 while ON voltage (e.g., 0 V) and OFF voltage (e.g., −200 V) are selectively applied to the second electrodes 22. FIG. 16 illustrates variations in voltages V1-0 to V1-7 applied to the first electrodes 21. As shown in FIG. 16, the first electrodes 21 are subjected to dynamic scan control to successively turn the applied voltages ON at intervals of a specified unit time. Only when both the applied voltages to the first electrodes 21 and the second electrodes 22 are ON voltage, toner passes through the toner through-hole 23 in each of the intersections to perform dot print.

The recording paper P is carried by the recording paper carrying roller 3 in a direction orthogonal to the first electrodes 21 and identical with a direction along which the dynamic scan control to the first electrodes 21 proceeds. +500 V voltage is applied to the recording paper carrying roller 3. The toner supply roller 1 is grounded, and its surface potential is 0 V.

An ultrasonic vibrator 5 is attached to the print head 2, so that ultrasonic vibration is applied to the print head 2 to prevent the toner through-hole 23 from clogging with toner.

FIGS. 17 to 20 illustrates a method of manufacturing the print head 2.

In the first stage of the process, a dual-side copper-leafed printed circuit board should be prepared by forming copper leaf on opposite major surfaces of the insulating layer 20 of polyimide polymeric material. Then, the copper leaf on the opposite major surfaces of the insulating layer 20 is partially etched away from non-electrode regions to form the second electrode 22 in one of the opposite major surfaces of the insulating layer 20 and the first electrode 21 in the other surface (see FIG. 17).

After that, an intersecting portion of the second electrode 22 and the first electrode 21 is etched away to form circular holes **23*a* and 23*b* (FIG. 18**).

Then, with masks of circumferential portions of the holes **23*a* and 23*b* in the second electrode 22 and the first electrode 21, the insulating layer 20 is irradiated with laser light from one side through either the second electrode 22 or the first electrode 21 to form a through-hole 23*b* which conducts the hole 23*a* to the 23*c* through the insulating layer 20 and which acts as a toner through-hole 23 (see FIGS. 19 and 20**).

In the above-mentioned method of fabricating the print head 2, if the hole **23*a* formed in the second electrode 22 is concentric with the hole 23*b* formed in the first electrode 21, a toner through-hole 23 is formed having a specified area of opening (hatched portion in FIG. 21) determined by a diameter of the hole 23*c*, as shown in FIGS. 21 and 22. In such a method of fabricating the print head 2, however, the hole 23*a* formed in the second electrode 22 is sometimes eccentric with the hole 23*b* formed in the first electrode 21, as shown in FIGS. 23 and 24. This results in the opening area of the toner through-hole 23 (a hatched portion in FIG. 23) becoming smaller than the specific area determined by the diameter of the hole 23*c***.

A diameter of the toner through-hole 23 is approximately 100 to 150 μm, and accuracy of registration of the hole **23*a* with the hole 23*b* formed by etching is within the limits of ±30 μm. Thus, an error to the diameter of the toner through-hole 23 in the registration of the hole 23*a* with the 23*b* formed by etching is not negligible. If the error in the registration by etching is 30 μm to the toner through-hole 23 of 100 μm diameter, the opening area of the toner through-hole 23 is reduced to about 60% of the predetermined value. With variations of 40% in the opening area of the toner through-hole 23**, an intended output image is found defective due to unevenness of density.

SUMMARY OF THE INVENTION

It is an object of the present invention to provide a method of forming developer through-holes in a print head in which unevenness in the area of opening of the developer through-holes in the print head can be avoided.

In accordance with an aspect of the present invention, in a method of forming developer through-holes in a print head which has a plurality of first electrodes and a plurality of second electrodes arranged in matrix with an insulating layer sandwiched therebetween, the improved method is characterized in that a main portion of each of the first electrodes is comprised of a couple of electrodes disposed in parallel with each other at a specified gap between them, a main portion of each of the second electrodes is comprised of a couple of electrodes disposed in parallel with each other at a specified gap between them, an intersecting portion of each of the first electrodes and each of the second electrodes is irradiated with laser light to form a hole in the insulating layer, and the gap between the parallel electrodes of each of the first electrodes, the hole formed in the insulating layer, and the gap between the parallel electrodes of each of the second electrodes together define a developer through-hole.

In accordance with another aspect of the present invention, in a method of forming developer through-holes in a print head which has a plurality of first electrodes and a plurality of second electrodes arranged in matrix with an insulating layer sandwiched therebetween, the improved method is characterized in that a main portion of each of the first electrodes is comprised of a couple of electrodes disposed in parallel with each other at a specified gap between them, a main portion of each of the second electrodes is comprised of a couple of electrodes disposed in parallel with each other at a specified gap between them, an intersecting portion of each of the first electrodes and each of the second electrodes is irradiated with laser light with a mask having a window to form a hole in the insulating layer, and the gap between the parallel electrodes of each of the first electrodes, the hole formed in the insulating layer, and the gap between the parallel electrodes of each of the second electrodes together define a developer through-hole.

In accordance with another aspect of the present invention, in a method of forming developer through-holes in a print head which has a plurality of first electrodes and a plurality of second electrodes arranged in matrix with an insulating layer sandwiched therebetween, the improved method is characterized in that elliptical holes of which major axes are not aligned with each other are formed in each of the first electrodes and each of the second electrodes at an intersecting portion of each of the first electrodes and each of the second electrodes, the intersecting portion of each of the first electrodes and each of the second electrodes is irradiated with laser light to form in the insulating layer a conducting hole connecting the elliptical holes in the first and second electrodes, and the elliptical hole in each of the first electrodes, the conducting hole formed in the insulating layer, and the elliptical hole in each of the second electrodes together define a developer through-hole.

Preferably, the elliptical holes formed in each of the first electrodes and each of the second electrodes at the intersecting portion of the first and second electrodes have their respective major axes arranged orthogonal to each other.

DETAILED DESCRIPTION OF THE PREFERRED EMBODIMENT

Preferred embodiments of the present invention will now be described with reference to FIGS. 1 to 7.

Figure 1:
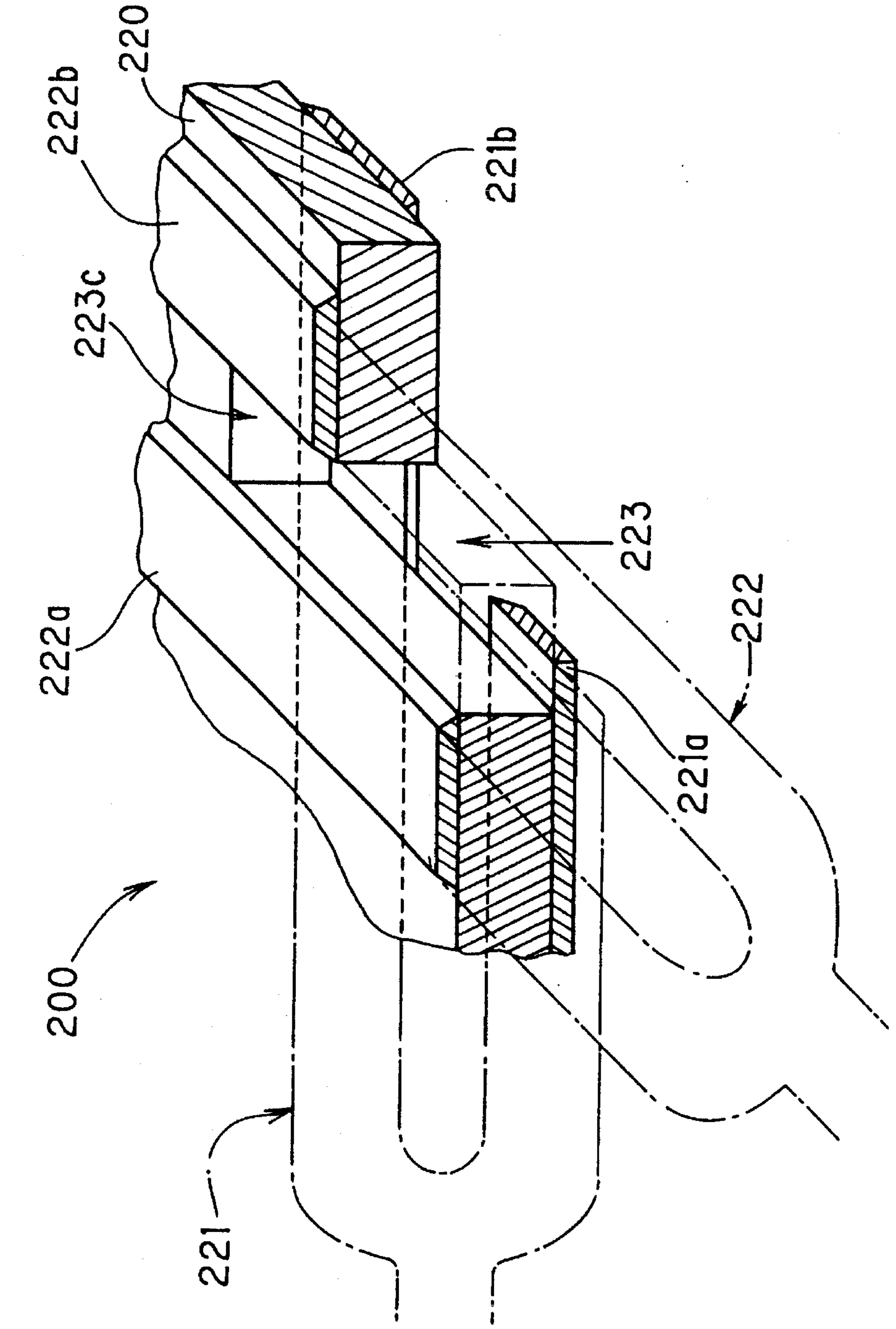
FIG. 1 is a perspective view showing a part of a print head.

FIG. 1 depicts a part of a print head 200.

Figure 14:
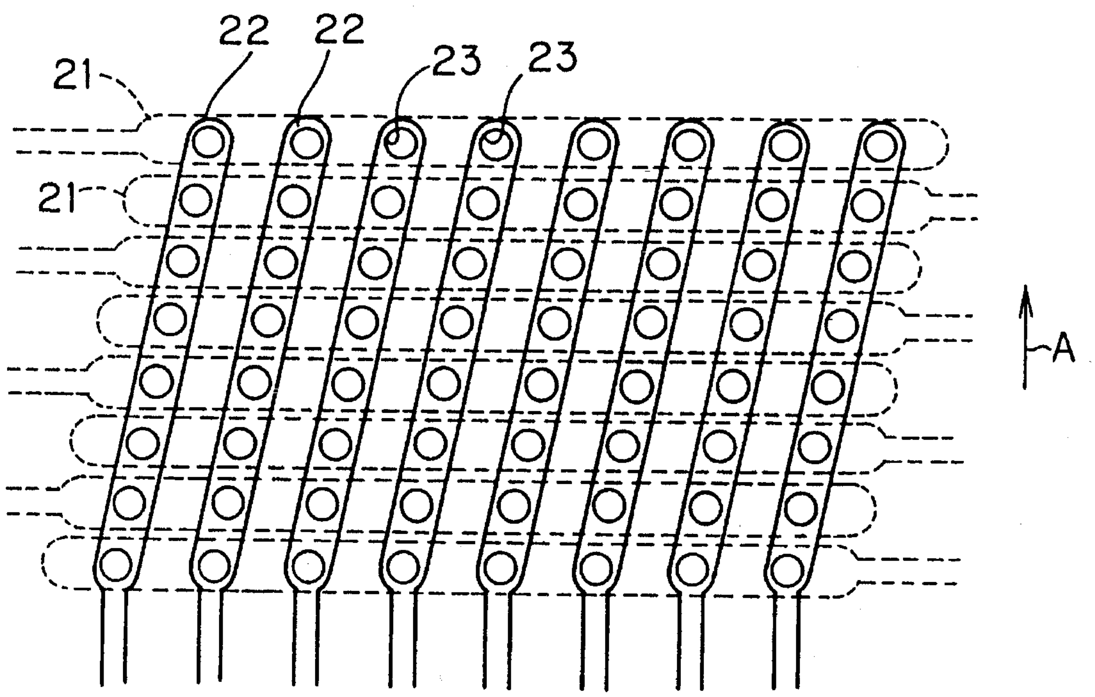
FIG. 14 (PRIOR ART)
FIG. 14 is a partially enlarged plan view showing an arrangement of first and second electrodes in a prior art print head.
Figure 15:
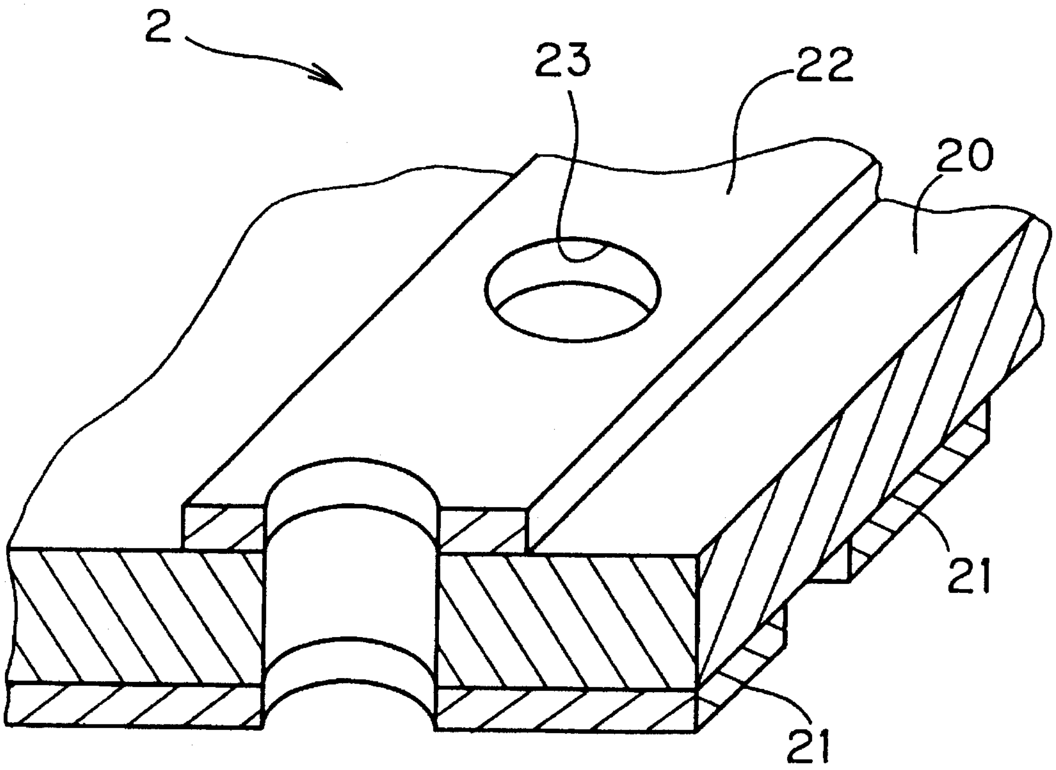
FIG. 15 (PRIOR ART)
FIG. 15 is a partially enlarged perspective view showing the prior art print head.
Figure 16:
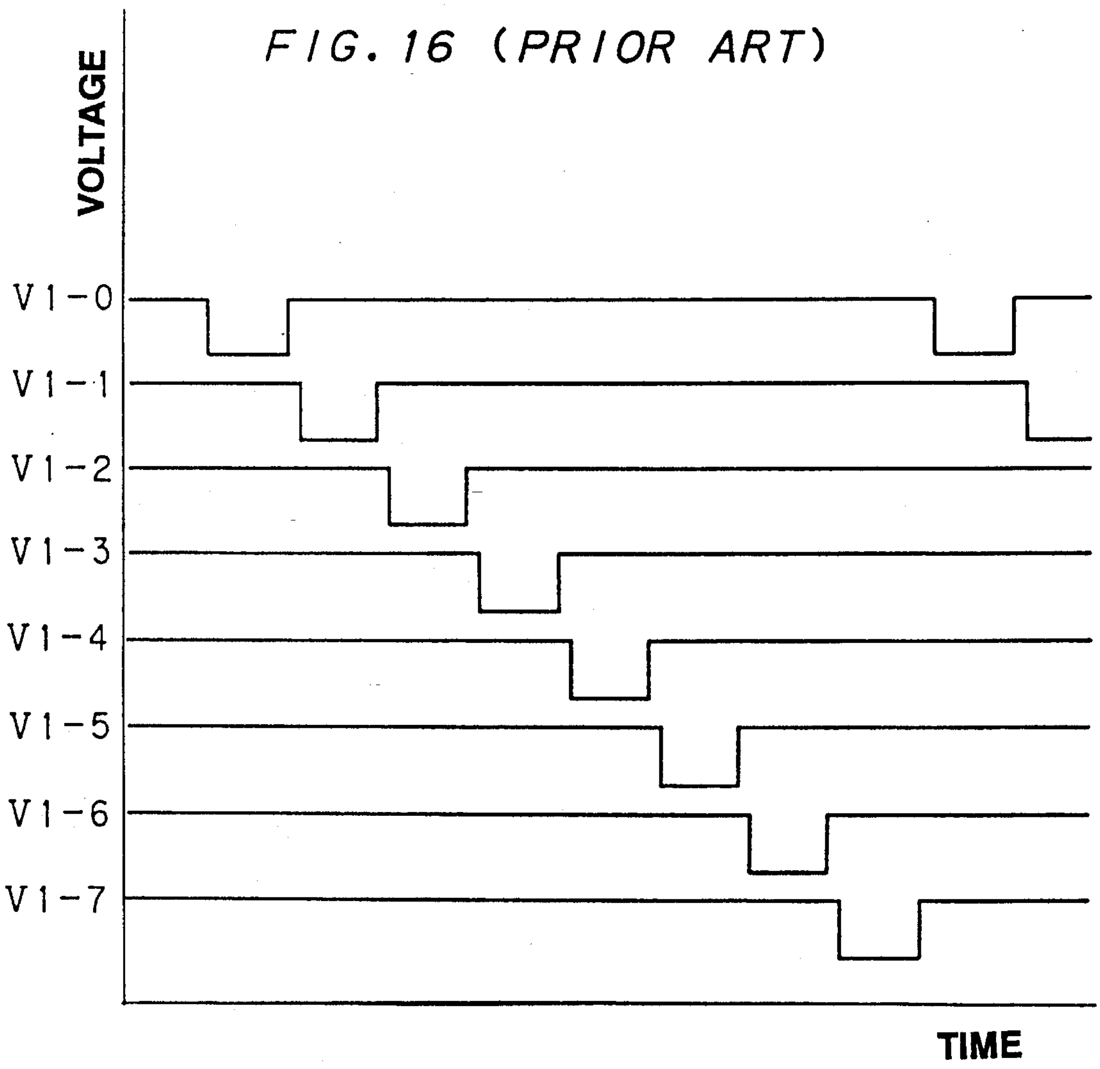
FIG. 16 (PRIOR ART)
FIG. 16 is a timing chart illustrating variations in voltage applied to the first electrodes.

The print head 200 includes an insulating layer 220 which has a plurality of second electrodes 222 in one of its major surfaces and a plurality of first electrodes 221 in the other major surface , similar to the prior art print head 2 (see FIG. 14). In the print head 200, however, each of the second electrodes 222 consists of two parallel electrodes **222*a* and 222*b* having their respective first ends or opposite ends connected to each other, unlike the prior art print head 2**.

In one of the pairs of the parallel electrodes **222*a* and 222*b* of the second electrodes 222, a gap between the parallel electrodes 222*a* and 222*b* may be, for example, 100 μm. As to one of the pairs of the parallel electrodes 221*a* and 221*b* of the first electrodes 221, similarly, a gap between the parallel electrodes 221*a* and 221*b*** may be 100 μm.

A hole **223*c* is formed in the insulating layer 220 at an intersection of each of the second electrodes 222 and each of the first electrodes 221 in a manner as stated later, so that the gap between the parallel electrodes 222*a* and 222*b* of each of the second electrodes 222, the hole 223*c*, and the gap between the parallel electrodes 221*a* and 221*b* of each of the first electrodes 221, aligned together, make a toner through-hole 223**.

Figure 2:
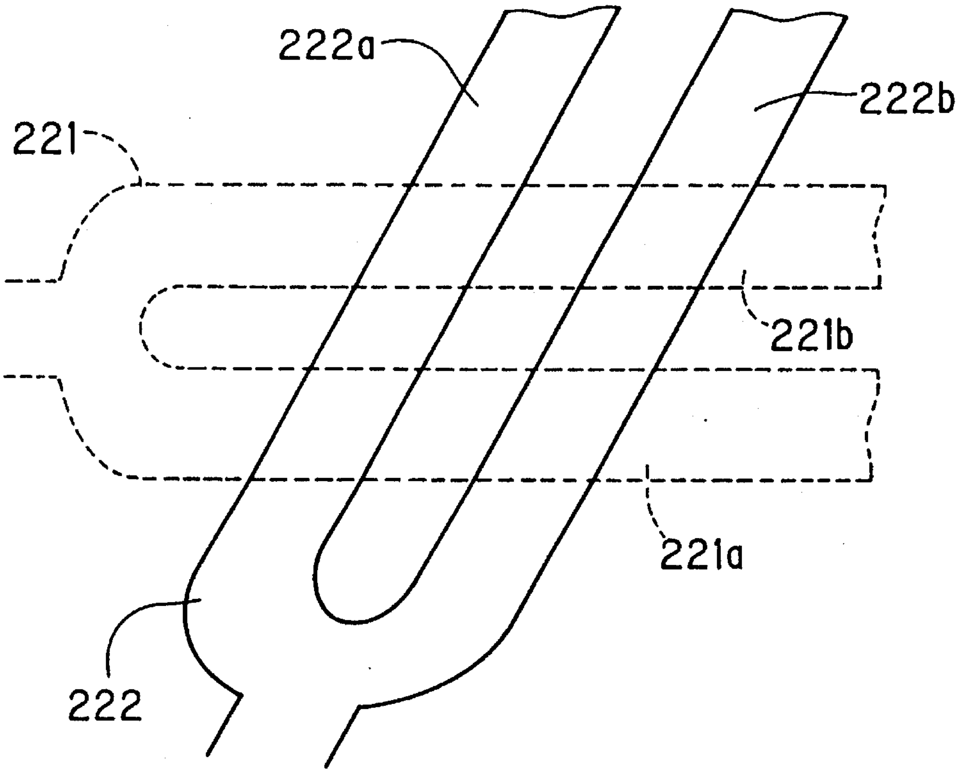
FIG. 2 is a plan view illustrating a first process of fabricating the print head shown in FIG. 1.
Figure 3:
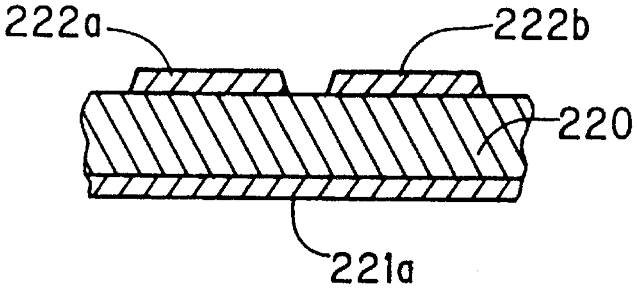
FIG. 3 is a sectional view of FIG. 2.
Figure 4:
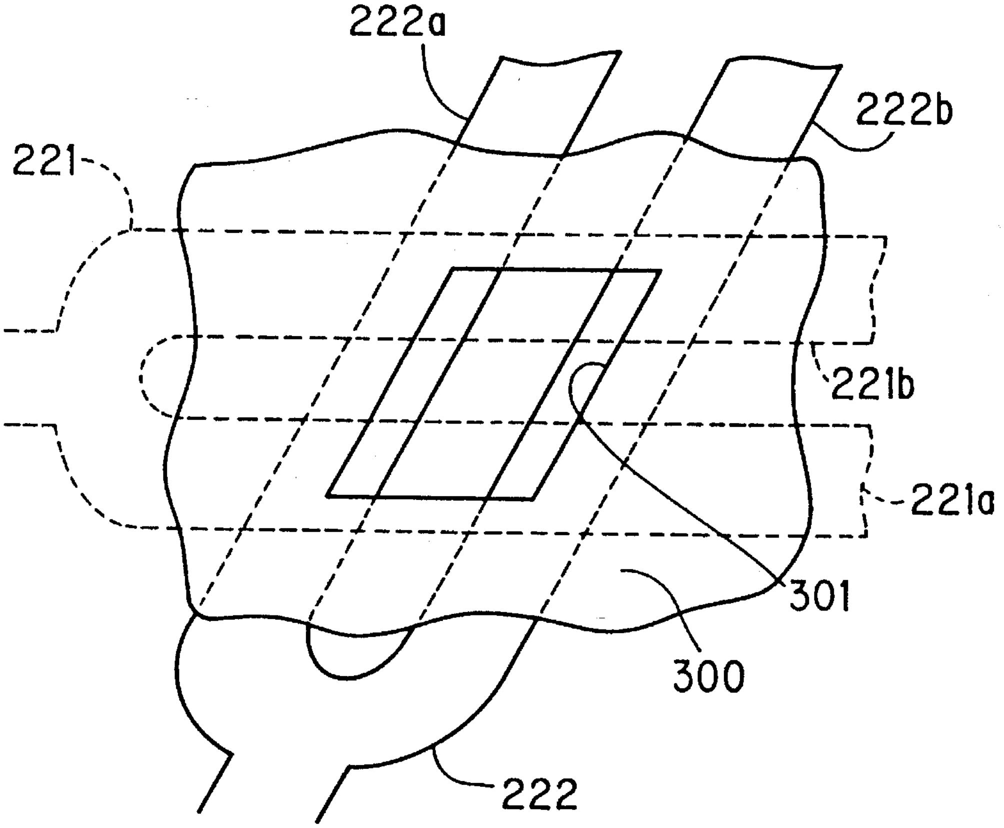
FIG. 4 is a plan view illustrating a second process of fabricating the print head shown in FIG. 1.
Figure 5:
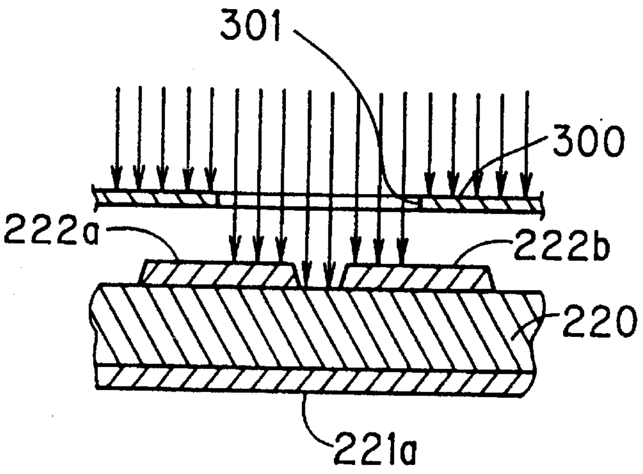
FIG. 5 is a sectional view of FIG. 4.
Figure 6:
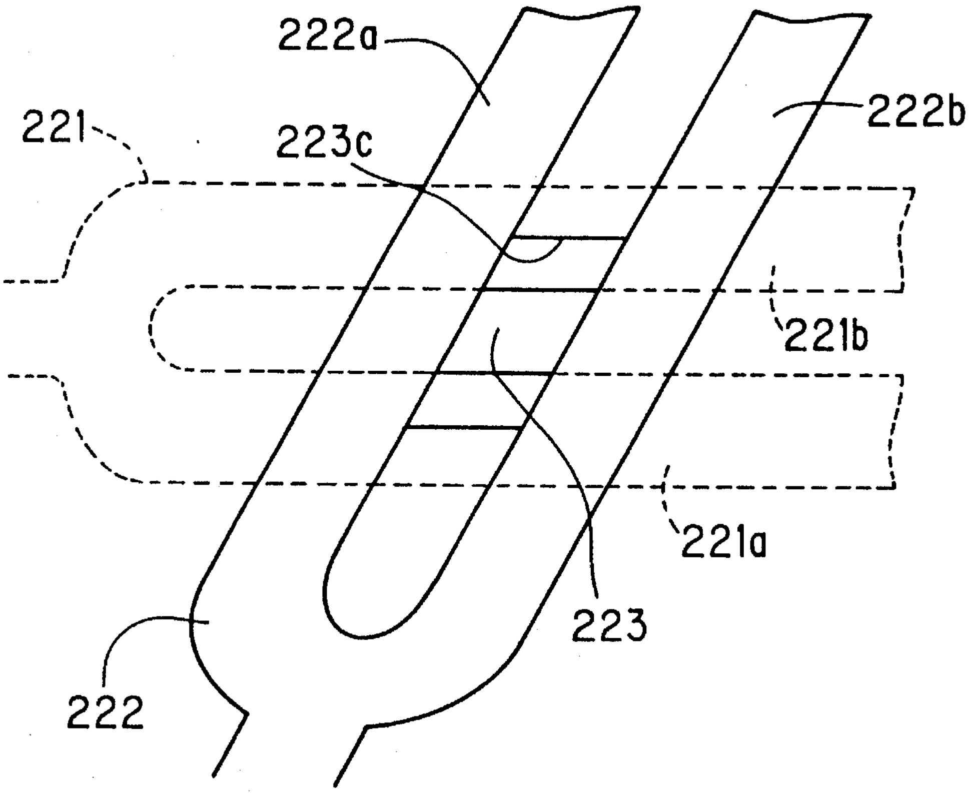
FIG. 6 is a plan view illustrating a third process of fabricating the print head shown in FIG. 1.
Figure 7:
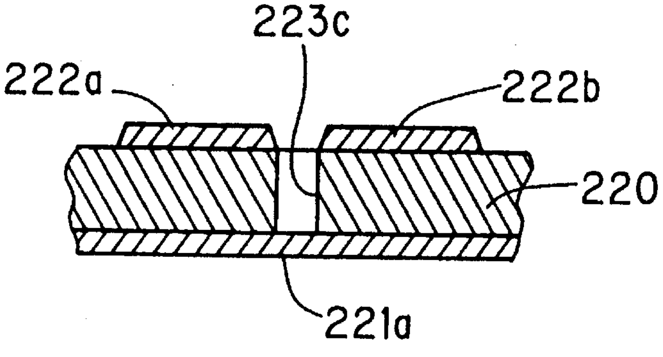
FIG. 7 is a sectional view of FIG. 6.

FIGS. 2 to 7 illustrate a process of fabricating the print head 200: FIGS. 2, 4 and 6 are plan views seen from a side proximate to the second electrode 222, FIG. 3 is a sectional view of FIG. 2, FIG. 5 is a sectional view of FIG. 4, and FIG. 7 is a sectional view of FIG. 6.

In the first stage of the process, a dual-side copper-leafed printed circuit board should be prepared by forming copper leaf on opposite major surfaces of the insulating layer 220 of polyimide polymeric material. Then, the copper leaf on the opposite major surfaces of the insulating layer 220 is partially etched away from non-electrode regions to form the second electrode 222 in one of the opposite major surfaces of the insulating layer 200 and the first electrode 221 in the other surface, as shown in FIGS. 2 and 3.

Then, as shown in FIGS. 4 and 5, a mask 300 having a rhombus window 301 formed therein is set in position on the second electrode 222 in the print head 200. The mask 300 is put so that the window 301 is positioned just at an intersection of the second electrode 222 and the first electrode 221. A length of a side of the window 301 of the mask 300 is larger than the gap between the parallel electrodes 222*a* and 222*b* (or the gap between the parallel electrodes 221*a* and 221*b* of the first electrode 221) of the second electrode 222 and is smaller than a shorter one of the widths of the first and second electrodes 221 and 222.

The mask 300 is irradiated with laser light from above to selectively eliminate the insulating layer 220. In such irradiation with a laser, since a threshold value in processing the second electrode 222 and the first electrode 221 formed of the copper leaf is highly different from that in processing the insulating layer 220, a hole is formed only in the insulating layer 220 without affecting the second electrode 222 and the first electrode 221. Specifically, the laser light passing through the window 301 makes the hole 223*c* in the insulating layer 220 with a mask of the parallel electrodes 222*a* and 222*b* of the second electrode 222, as shown in FIGS. 6 and 7. Thus, a horizontal cross section of the hole 223*c* formed in the insulating layer 220 is shaped in a parallelogram having a lateral length identical with a width of the gap between the parallel electrodes 222*a* and 222*b* of the second electrode 222 and having a longitudinal length identical with a length of one side of the window 301 of the mask 300.

In the print head 200 fabricated in the above-mentioned process, an effective area of opening of any toner through-hole 223 is determined by the length of the gap between the parallel electrodes 222*a* and 222*b* of the second electrode 222 and the length of the gap between the parallel electrodes 222*a* and 222*b* of the first electrode 221 and is uniform.

While the laser light directed from a side proximate to the second electrode 222 makes a hole in the insulating layer 220 in the above-mentioned embodiment, it may be directed from the opposite side proximate to the first electrode 221 to make the hole in the insulating layer 220.

Alternatively, the laser light may be directed from a side proximate to one of the first electrode 221 and the second electrode 220 to make a hole down to or up to a half of a thickness of the insulating layer 220, and thereafter, it may be directed from the opposite side to finish the hole regarding the remaining half of the thickness of the insulating layer 220. In such a case, the mask may be used or may not have to be used.

Figure 8A:
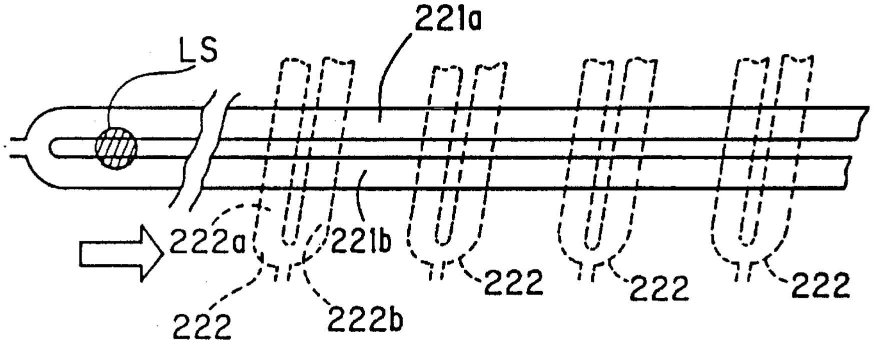
FIG. 8 is a diagram illustrating a variation of a method of forming a hole in an insulating layer.
Figure 8B:
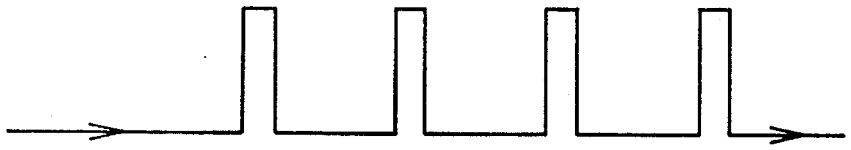
Figure 8C:
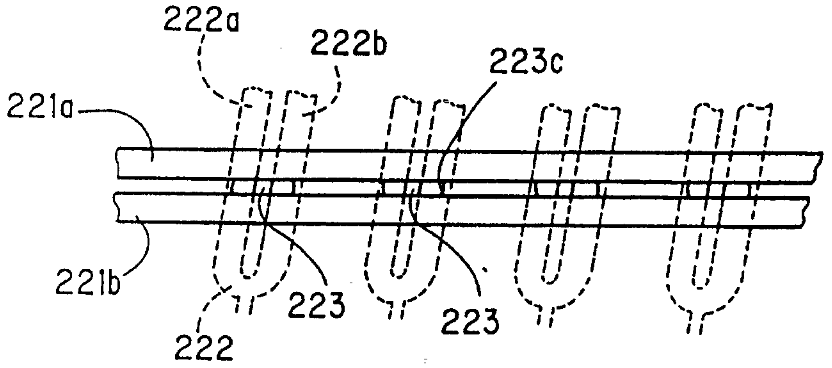

FIG. 8 illustrates a process of making a hole in the insulating layer 220 without a mask in the event that the insulating layer 220 is irradiated with the laser light only from the side proximate to the first electrode 221 to make the hole. FIG. 8(*a*) is a plan view showing the print head seen from the side proximate to the first electrode 221 while FIG. 8(*b*) depicts a timing of irradiation with laser.

Referring to FIGS. 8(*a*) and 8(*b*), a laser device is used to scan the printed circuit board along on the gap between the parallel electrodes 221*a* and 221*b* of the first electrode 221, and laser light producing a specified area of laser spot LS is emitted from the laser device when it is sensed that the laser device is positioned right above the gap between the parallel electrodes 222*a* and 222*b* of any of the second electrodes 222.

In this way, as shown in FIG. 8(*c*), the hole 223*c* is formed in the insulating layer 220 at any intersection of the first electrodes 221 and the second electrodes 222.

Types of laser used in the above process include $CO_2$ laser, YAG laser and excimer laser. Moreover, it is preferable to forcibly vacuum or to use jetted assistance gas to eliminate carbide in development in processing with the laser.

Although there has been discussed in the above embodiment a case where the insulating layer 220 is irradiated with the laser light from the side proximate to the first electrode 221 to make a hole therein, the same process may be employed to make a hole in the insulating layer 220 by directing the laser light only from the side proximate to the second electrode 222 without a mask.

Figure 9:
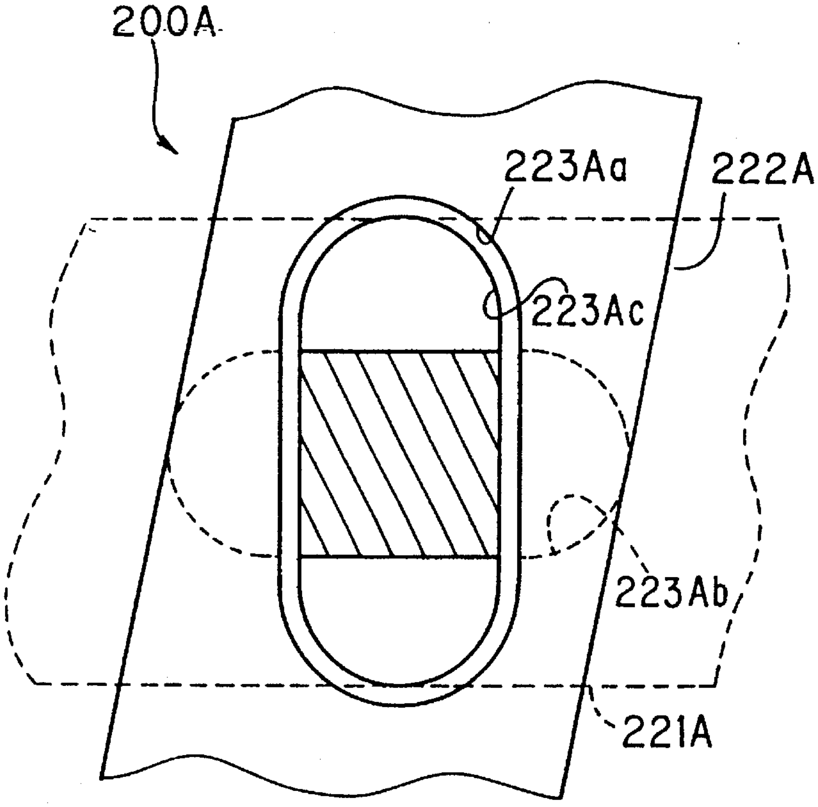
FIG. 9 is a plan view showing another example of the print head.
Figure 10:
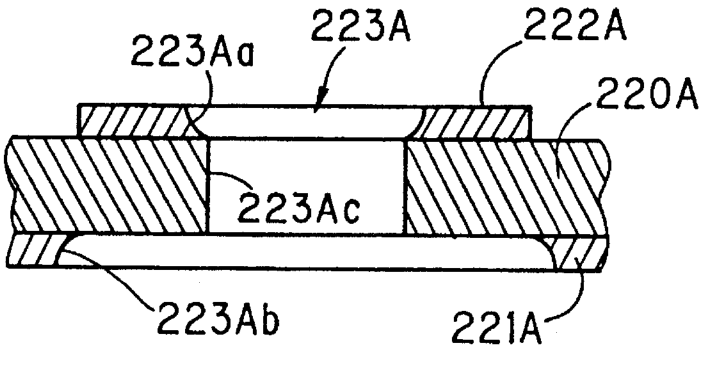
FIG. 10 is a sectional view of FIG. 9.

FIGS. 9 and 10 depict another embodiment of the present invention. FIG. 9 is a plan view showing a part of a print head 200A seen from a side proximate to any of second electrodes 222A while FIG. 10 is a sectional view of FIG. 9.

In this embodiment, each of the second electrodes 222A and each of first electrodes 221A are shaped in a single plate electrode similar to the prior art embodiment. Also, a process of fabricating the print head 200A is almost the same with the prior art process, but it is different from the prior art process in the shape of hole formed in the second electrodes 222A and the first electrodes 221A.

Figure 17:
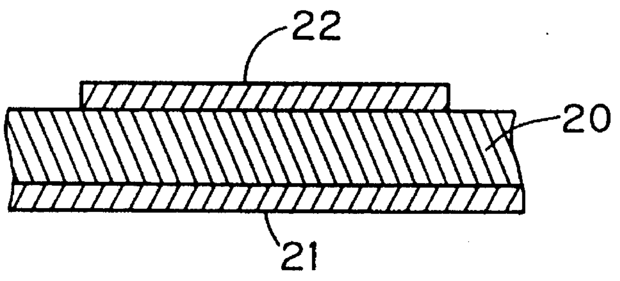
FIG. 17 (PRIOR ART)
FIG. 17 depicts a first stage of a prior art process of fabricating a print head.
Figure 18:
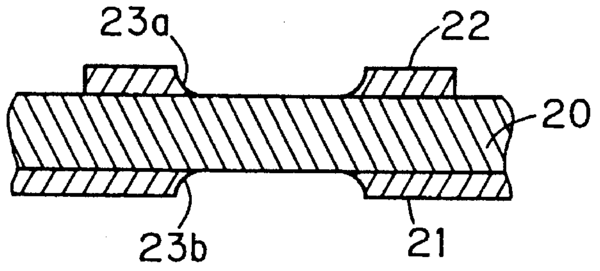
FIG. 18 (PRIOR ART)
FIG. 18 depicts a second stage of the prior art process of fabricating a print head.
Figure 19:
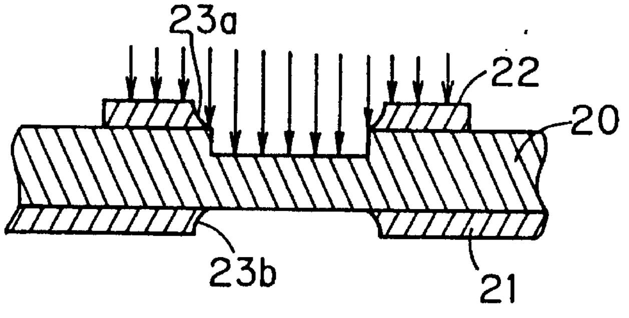
FIG. 19 (PRIOR ART)
FIG. 19 depicts a third stage of the prior art process of fabricating a print head.
Figure 20:
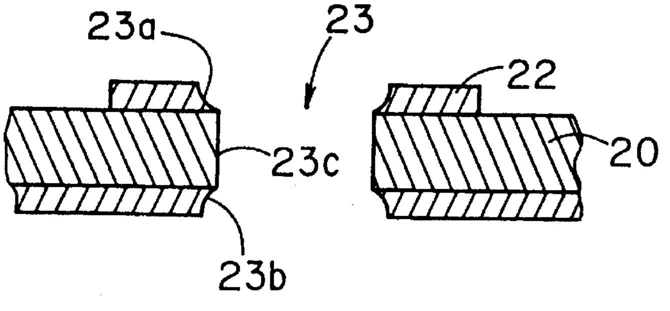
FIG. 20 (PRIOR ART)
FIG. 20 depicts a fourth stage of the prior art process of fabricating a print head.
Figure 21:
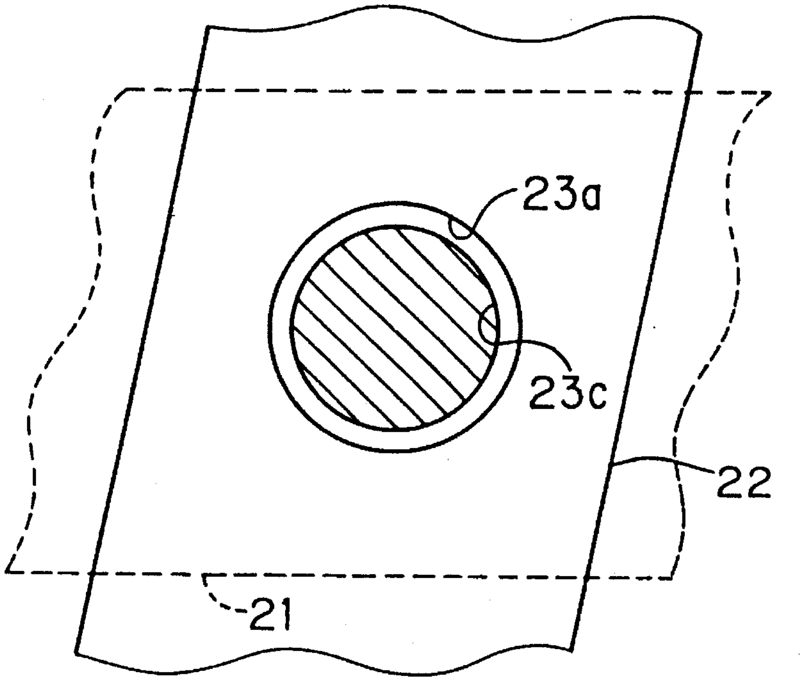
FIG. 21 (PRIOR ART)
FIG. 21 is a plan view showing a toner through-hole in the event that a hole formed in one of the second electrodes is concentric with a hole formed in one of the first electrodes.
Figure 22:
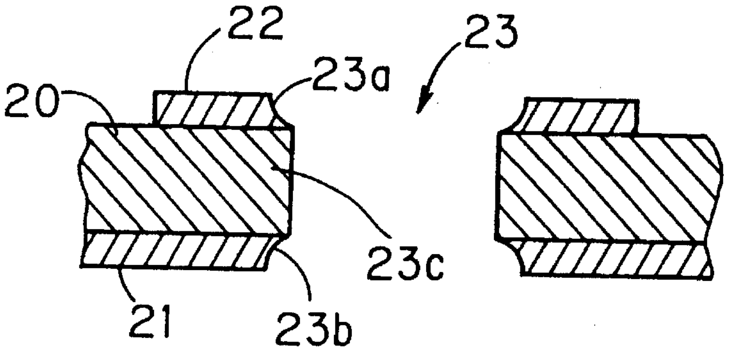
FIG. 22 (PRIOR ART)
FIG. 22 is a sectional view of FIG. 21.
Figure 23:
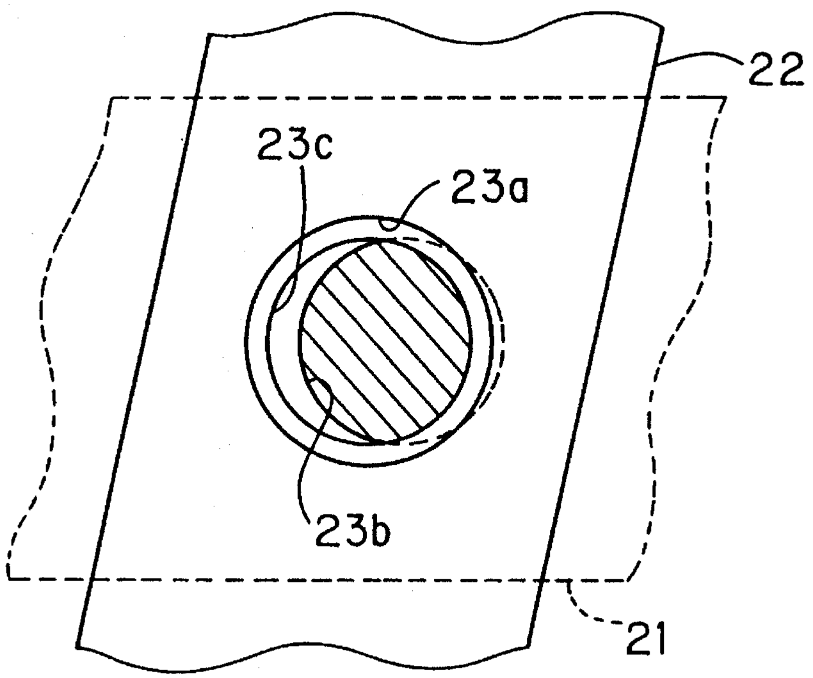
FIG. 23 (PRIOR ART)
FIG. 23 is a plan view showing a toner through-hole in the event that the hole formed in one of the second electrodes is eccentric with the hole formed in one of the first electrodes.
Figure 24:
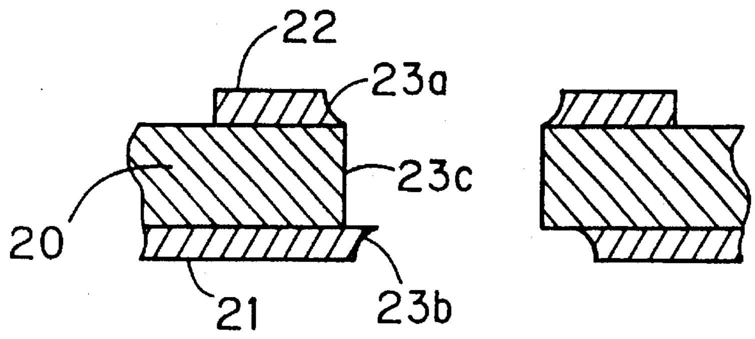
FIG. 24 (PRIOR ART)
FIG. 24 is a sectional view of FIG. 23.

The process of fabricating the print head 200A is briefly described below. In the first stage of the process, a dual-side copper-leafed printed circuit board should be prepared by forming copper leaf on opposite major surfaces of the insulating layer 220A of polyimide polymeric material. Then, the copper leaf on the opposite major surfaces of the insulating layer 220A is partially etched away from non-electrode regions to form the second electrode 222A in one of the opposite major surfaces of the insulating layer 220A and the first electrode 221A in the other surface. The procedure thus far is completely the same with the prior art illustrated in FIG. 17.

After that, intersecting portions of both the second electrode 222A and the first electrode 221A are etched away to form non-circular elliptical holes 223A*a* and 223A*b* having their respective major axes placed orthogonal to each other.

Then, with a mask of a circumferential portion of the hole 223A*a* in the second electrode 222A, the insulating layer 220A is irradiated with laser light from the side proximate to the second electrode 222A to form a hole 223A*c* which conducts the holes 223A*a* and 223A*b*, and in this way, a toner through-hole is formed. Thus, the print head 200A as shown in FIGS. 9 and 10 is obtained.

Although the hole 223A*c* is formed in the insulating layer 220A by irradiating the insulating layer 220A with the laser light from the side proximate to the second electrode 222A with the mask of the circumferential portion of the hole 223A*a* in the second electrode 222A in the above embodiment, the insulating layer 220A may be irradiated with the laser light from the opposite side proximate to the first electrode 221A with the mask of the circumferential portion of the hole 223A*b* in the first electrode 221A to make the hole.

Figure 11:
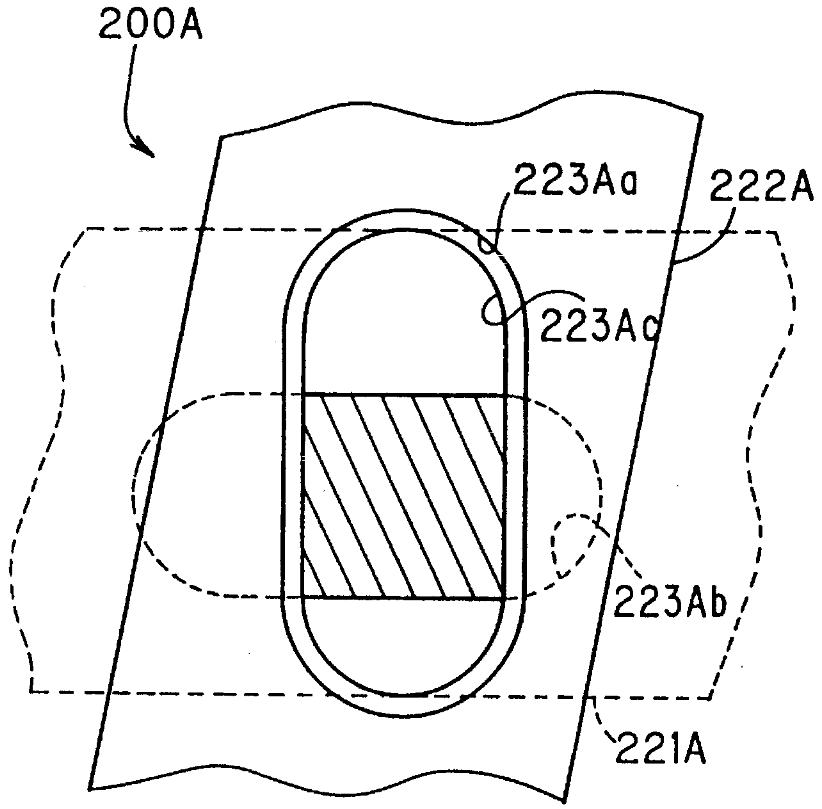
FIG. 11 is a diagram showing a toner through-hole in the event that an elliptical hole formed in one of second electrodes is eccentric with an elliptical hole formed in one of first electrodes in the process of fabricating the print head shown in FIG. 9.
Figure 12:
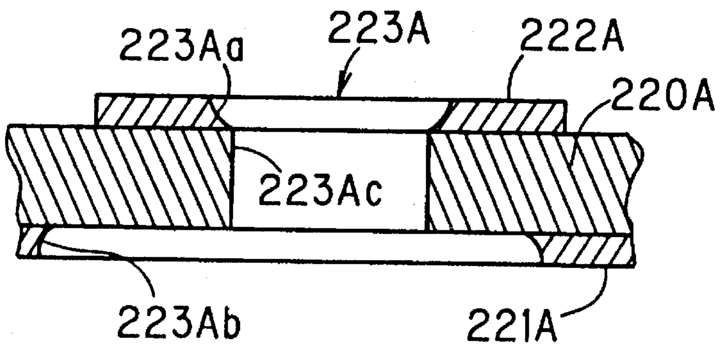
FIG. 12 is a sectional view of FIG. 11.
Figure 13:
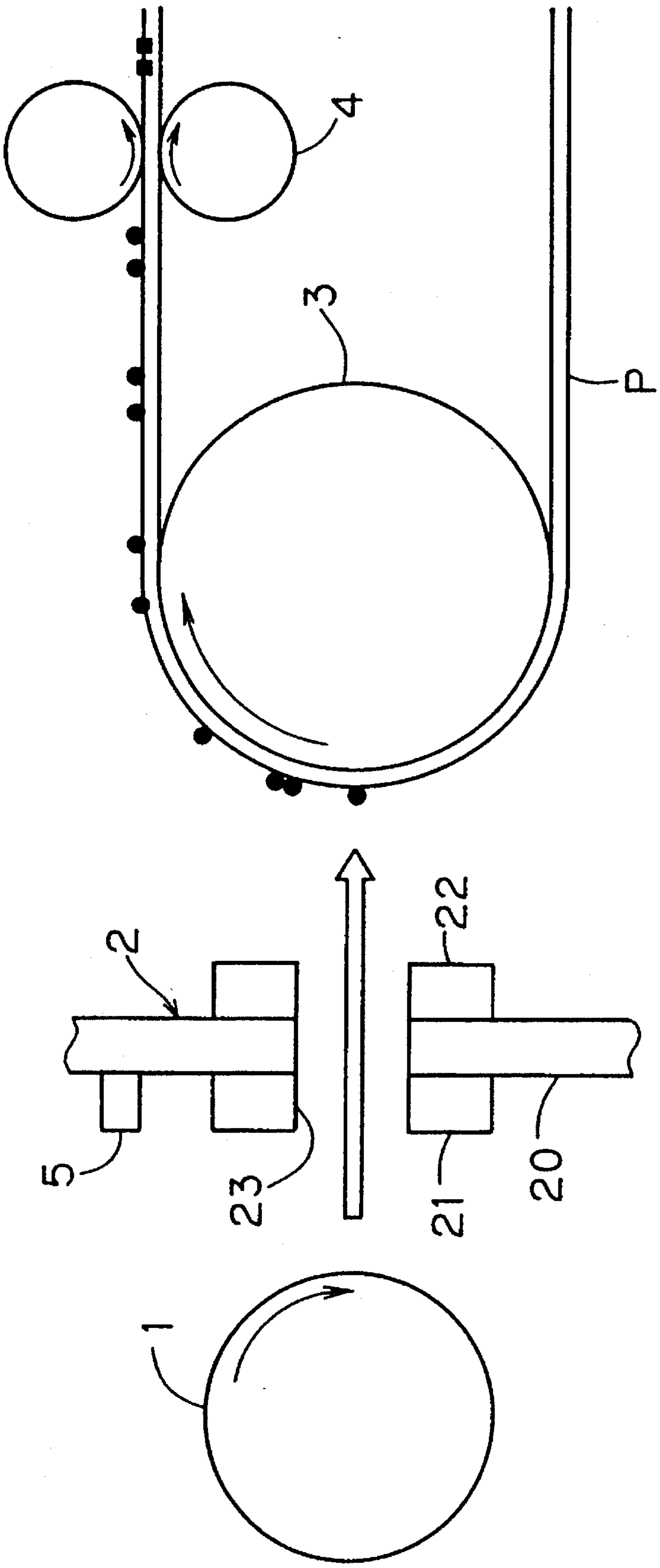
FIG. 13 (PRIOR ART)
FIG. 13 is a schematic diagram showing an arrangement of a powder jet image formation apparatus.

In this embodiment, if the elliptical hole 223A*a* formed in the second electrode 222A is eccentric with the elliptical hole 223A*b* formed in the first electrode 21A at the intersecting portions of both the second electrode 222A and the first electrode 221A as shown in FIGS. 11 and 12, an effective area of opening (a hatched portion in FIG. 11) of any of the toner through-holes 223A is determined by a length of minor axes of the elliptical holes 223A*a* and 223A*b* and is uniform.

While the elliptical holes 223A*a* and 223A*b* are formed having their respective major axes got orthogonal to each other in the above embodiment, those axes do not have to necessarily be orthogonal to each other. Alternatively, for example, the elliptical hole 223A*a* may be formed so that its major axis is in parallel with a longitudinal extension of the second electrode 222A; that is, the elliptical holes 223A*a* and 223A*b* may be disposed having their respective major axes got orthogonal to each other.

What is claimed is:

1. A method for forming developer through-holes in a print head which has a plurality of first electrodes and a plurality of second electrodes arranged in a matrix with an insulating layer sandwiched therebetween, and a main portion of each of the first electrodes is comprised of a pair of electrode sections disposed in parallel with each other at a specified gap width therebetween so as to define a gap section in each of said first electrodes, and a main portion of each of said second electrodes is comprised of a pair of electrode sections disposed in parallel with each other at a specified gap width therebetween so as to define a gap section in each of said second electrodes, and wherein the electrode sections of the main portions of said first electrodes extend along a first direction, and the electrode sections of the main portions of said second electrodes extend along a second direction which is non-parallel with the first direction such that said first and second electrodes and the gap sections of each of said first and second electrodes are positioned in a criss-crossed, spaced overlapping arrangement, and said method comprising:

irradiating with laser light intersection portions of the gap sections in said first and second electrodes so as to form holes in the insulating layer, with each hole extending from an intersecting portion of the gap section in said first electrode, through the insulating layer, and to the intersection portion of a corresponding gap section in said second electrode so as to define the developer through-holes in said print head.

2. A method as recited in claim 1 further comprising passing said laser light through a mask having a window.

3. A method as recited in claim 2 wherein said window has a rhombus shape with an opposing first pair of sides extending parallel with said first direction and a second pair of opposing sides extending parallel with said second direction.

4. A method as recited in claim 3 wherein a length of each of the opposing first pair of sides is longer than said gap width formed between the electrode sections of the main portions of said first electrodes.

5. A method as recited in claim 1 wherein irradiating occurs without utilizing a mask.

6. A method as recited in claim 1 further comprising forming said gap sections in each of said first and second electrodes prior to irradiating with the laser light.

7. A method of forming developer through-holes in a print head which has a plurality of first electrodes and a plurality of second electrodes arranged in a matrix with an insulating layer sandwiched therebetween, said first electrodes extending in a first direction and including elliptical holes with major axes extending in said first direction, and said second electrodes extending in a second direction which is nonparallel with the first direction and said second electrodes including elliptical holes with major axes extending in the second direction, whereby said first and second electrodes are positioned in a criss-crossed, spaced overlapping arrangement with corresponding elliptical holes of said first and second electrodes overlapping at intersecting portions in the crisscrossed first and second electrodes, said method comprising:

irradiating an intersecting portion of each of said corresponding elliptical holes of said first and second electrodes so as to form a hole in the insulating layer which hole extends between the intersecting portion of each of the corresponding overlapping elliptical holes and through the insulating layer therebetween so as to define the developer through-holes.

8. A method according to claim 7, wherein the elliptical holes formed in each of the first electrodes and each of the second electrodes at the intersecting portion of the first and second electrodes have their respective major axes positioned orthogonal to each other.

* * * * *